United States Patent [19]

Bisson

[11] 3,733,019

[45] May 15, 1973

[54] TAPE CASSETTES

[75] Inventor: Flavio Bisson, Montalto Dora, Italy

[73] Assignee: Ing. C. Olivetti & C., S.p.A., Turin, Italy

[22] Filed: Feb. 17, 1971

[21] Appl. No.: 116,043

[30] Foreign Application Priority Data

Feb. 17, 1970 Italy ............................67512 A/70

[52] U.S. Cl. ..............................................226/119

[51] Int. Cl. ..........................................B65h 17/42

[58] Field of Search..............................226/118, 119; 179/100.2 Z

[56] References Cited

UNITED STATES PATENTS

| | | | |
|---|---|---|---|
| 3,464,611 | 9/1969 | Verdone | 226/119 |
| 3,346,161 | 10/1967 | Ironside et al. | 226/118 X |
| 3,420,425 | 1/1969 | Haddon et al. | 226/119 X |
| 3,543,983 | 12/1970 | Dale et al. | 226/118 |

FOREIGN PATENTS OR APPLICATIONS

| | | | |
|---|---|---|---|
| 877,211 | 9/1961 | Great Britain | 226/118 |

*Primary Examiner*—Allen N. Knowles
*Attorney*—Birch, Swindler, McKie & Beckett

[57] ABSTRACT

A tape cassette is disclosed including a holding chamber substantially in the shape of an upper case G having a downward branch including a tape entrance and an upward branch including a tape exit. The cross-sectional area of the downward branch increases to a maximum and then decreases to a minimum, the minimum occurring at the junction between the upward and downward branches. The walls defining the downward branch are also stepped providing a sudden increase in the cross-sectional area of the branch, allowing the tape to fall easily therethrough.

6 Claims, 2 Drawing Figures

INVENTOR
FLAVIO BISSON

BY Birch, Swindler, McKie & Beckett
ATTORNEYS

TAPE CASSETTES

BACKGROUND OF THE INVENTION

The present invention relates to improvements in tape cassettes, particularly of the type containing an endless loop of tape normally used as a large capacity storage device in information processing equipment. Such cassettes serve as re-circulating type archive storage adapted to be selectively applied to the information processing equipment for reading and/or writing data or programs.

Tape cassettes are known wherein the tape is accommodated in the internal chamber of the cassette in continuous folds. The chamber is provided with openings through which the tape may emerge for being fed by means external to the cassette into contact with a writing or reading head.

A known cassette capable of holding an information tape comprises a chamber defined by two substantially parallel walls wherein the tape is accommodated in continuous folds of predetermined size. The chamber has a curved shape substantially similar to an upper case G and is provided with two slits located on the same side on the cassette, one on the top and the other on the bottom. The tape enters the chamber through the top slit, bends on itself building up a succession of folds, and sinks due to its own weight to the bottom slit from which it emerges.

But the described cassette has some disadvantages. In cassettes of small or medium size the tape tends to accumulate in proximity to the bottom slit, making withdrawal of the tape difficult. Furthermore, the accumulation of the tape in proximity to the slit results in a high friction between adjacent folds of the tape as it is withdrawn.

In the known cassettes it is ordinarily necessary to aid the sinking of the tape toward the bottom of the chamber after the tape has entered the chamber and folded on itself.

SUMMARY OF THE INVENTION

It is an object of this invention to alleviate or overcome these disadvantages.

A tape cassette according to this invention comprises a tape container including a chamber whose walls define a curved form substantially similar to an upper case G. The chamber includes a downward branch and an upward branch, preferably of rectangular cross-section and of substantially constant width. An endless loop information tape is accommodated in the chamber in successive folds. The chamber has an access and an emerging end located on the same side of the container in upper and lower positions respectively. The tape loop enters the downward branch of the chamber and emerges from the upward branch. The cross-sectional area of the downward branch, starting from the access end, at first increases to a maximum, and then decreases until reaching a minimum where the downward branch joins the upward branch thereby defining a narrowing passage in the chamber at the branch junction. Thus, after falling through the downward branch, the tape is unfolded and straightened through the upward branch before emerging from the chamber.

In the cassette according to the invention the establishment of the narrow passage at the junction between the two branches of the chamber enables the formation of a free space between the passage wherein the tape accumulates and the emerging opening so that the tape may be freely straightened and withdrawn without difficulty and wear.

BRIEF DESCRIPTION OF THE DRAWINGS

This and other characteristics and advantages of the invention will become apparent from the following description of a preferred embodiment given by way of example and not with the intention of limiting the invention thereto. In the accompanying drawings.

DESCRIPTION OF A PREFERRED EMBODIMENT

Figure 2:
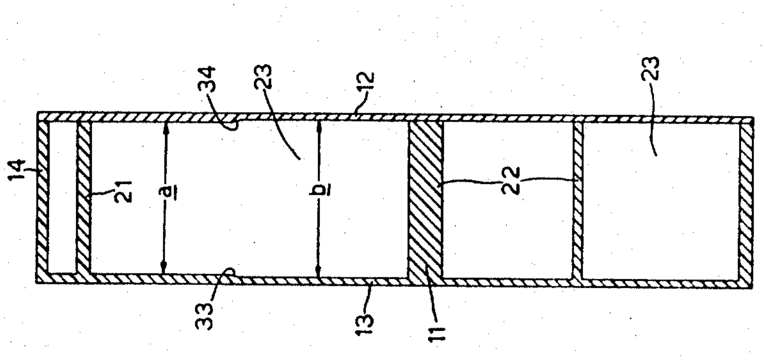
FIG. 2 is a view in section of the cassette of FIG. 1 along the line II—II.
Figure 1:
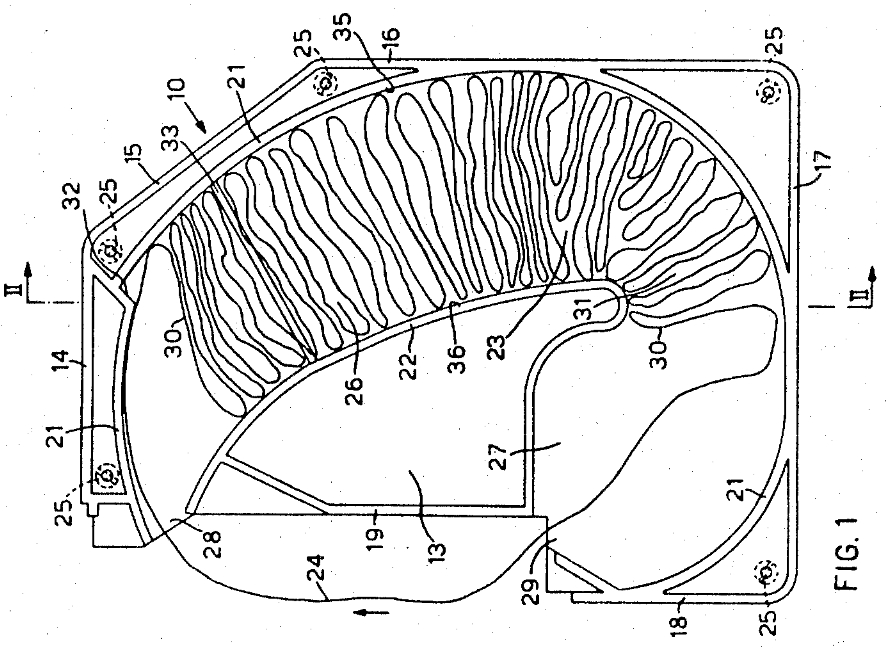
FIG. 1 is a side view of a cassette according to the invention.

With reference to FIGS. 1 and 2, a cassette according to the invention comprises a tape container 10 constructed of two parts i.e. a box 11 and a closing cover 12 which preferably comprises a flat wall.

The box 11 in turn comprises a bottom portion 13 having a rectangular flat wall or shaped as shown in FIG. 1, and side walls 14, 15, 16, 17, 18 and 19. Inside the box 11 are two curved walls 21 and 22, rigidly connected to wall 13 and defining a chamber 23 which has a shape substantially similar to an upper case G. The two parts of box 11 are made integral by means of fixing screws 25. The cross-sectional area of the chamber is defined in describing this embodiment as comprising the chamber width (*a*, *b*, in FIG. 2) defined by walls 12 and 13 and the chamber depth defined by walls 21 and 22.

The chamber 23 includes an upward branch 27 and a downward branch 26 wherein an endless loop tape 24 acting as a magnetic information carrier is accommodated in a plurality of folds 30.

The chamber 23 also includes an access opening 28 and an emerging opening 29 located in upper and lower positions respectively on the same side of the container 10, i.e. the side defined by the lateral portions 18 and 19. The tape 24 which is in the form of an endless loop, may enter the downward branch 26 and exit from the upward branch 27 of the chamber 23 through the openings 28 and 29 respectively.

The tape 24, in the path portion outside the container 10, is set in motion by suitable driving means and driven past a reading and/or writing head to read out or record information thereon at a constant speed. The driving means and writing head are not shown as they may be of conventional design and form no part of this invention.

The cross-sectional areas of the chamber 23 are rectangular in shape, and preferably of constant width. The cross-sectional area of the downward branch 26, starting from the access opening 28 at first increases until reaching a maximum substantially at the section defined by 35-36 in FIG. 1, and then decreases until reaching a minimum at the junction between the downward branch 26 and the upward branch 27. Thus, a narrowed passage 31 is defined in the chamber 23, between the two branches 26 and 27.

The curved wall 21 of the chamber at a predetermined distance from the access opening 28 shows a sharp change of profile as it defines a depression 32 which causes folding of the tape 24 within the chamber 23. The distance of the depression 32 from the access opening 28 is chosen so that at a given tape feeding speed the tape builds up folds whose length is substantially equal to the depth of the downward branch 26 of the chamber in the transverse section immediately subsequent to the depression 32.

The tape 24 is fed into the chamber 23 through the access opening 28 and travels substantially parallel to the initial segment of the curved wall 21.

When the tape reaches the position corresponding to the depression 32, it folds on itself at determined intervals building up a succession of runs 30. As these runs 30 are formed, the tape 24 fills the depth of the chamber 23 with successive folds. This manner of storing the tape allows the storage of large quantities of information in archive storage, and at the same time aids the circulation of the endless tape loop through the length of the container, so that high driving speeds may be used.

In order to facilitate the descent by gravity of the tape 24 through the length of chamber 23, two steps 33 and 34 are located on the two internal faces of the bottom wall 13 and the cover 12 in an intermediate zone of the downward branch 26. Thus, the varying width of the cross-section includes a discontinuity determining a sudden increment increasing the cross-sectional area of the downward branch 26 in the feeding direction.

Using, for example, a tape 1 inch (25.4 mm) in width, the width *a* (FIG. 2) of the upper portion of the branch 26 may be as much as 27 mm. A close tolerance is necessary in this entering zone because the tape must be guided to prevent its turning or twisting. After the steps 33, 34, the width *b* may be for example as high as 27.6 mm. The numbers are provided for the sake of an illustrative example, and useful embodiments are not limited thereto.

The descent of the tape 24 through the chamber 23 is thus aided both by the progressive increase of the depth of the successive cross-sections of the branch 26, and by the sudden change of width of these sections provided by the steps 33 and 34.

Descending further, the tape 24 reaches the position corresponding to the narrowing passage 31 where it accumulates as it is slowed by the progressive reduction in the cross-section area of the downward branch 26. The narrowing passage 31 prevents the tape fold bundle from filling the upward branch 27 due to its weight, hindering the withdrawal of the tape from the container by obstructing the emerging opening 29.

The upward branch 27 remains free and therefore functions as a waiting room for the reading and drive stations acting on the tape 24, so that the latter can unfold and extend for easy withdrawal from the emerging opening 29. Consequently, the tape segment that unfolds and emerges does not undergo any rubbing action against either the fold bundle held by the narrowing passage 31 or against the walls of the upward branch 27.

On the outside of the container 10 near the emerging opening 29 the cassette may be provided with a brake (not shown) adapted to control the emerging speed of the tape, cooperating with the driving means during the reading or writing operation to stretch the tape segment passing past the head and lock the tape when the drive is discontinued, thereby preventing its continued emergence from the container.

The container 10 may typically be constructed of insulating plastic material (for example of ABC or transparent polycarbonate) having incorporated therein some antistatic means in order to prevent electrostatic attraction of the tape to the walls of the chamber 23. In order to reduce to a minimum the friction of the tape on the shaped walls 21 and 22 of the chamber, the latter may be coated with a material having a low friction coefficient and low electrostatic attraction (for example, a Scotchlite tape, produced by the Minnesota Mining and Manufacturing Company) provided with a glass bead coating on the exposed face.

I claim:

1. A tape cassette comprising a chamber having a curved form, said chamber including a downward branch and an upward branch meeting at a junction, said chamber accomodating an endless loop information tape in a plurality of folds, the walls of said chamber defining an access opening adjacent said downward branch and an emerging opening adjacent said upward branch, said access and emerging openings being located on the same side of said cassette, said tape loop entering said downward branch through said access opening, passing through said junction and emerging from said upward branch through said emerging opening, wherein the improvement comprises:

said downward branch including first and second zones, said chamber walls defining in said first zone an increasing cross-sectional area through said zone to a predetermined maximum cross-sectional area, and in said second zone defining said cross-sectional area decreasing from said maximum cross-sectional area to a minimum cross-sectional area at the junction between said downward and upward branches, said first zone of said downward branch including a discontinuity in said walls providing an increase in the width of the chamber adjacent the edges of the tape thereby facilitating passage of the tape through said downward branch, a portion of said second zone of said downward branch adjacent said junction providing a narrowing passage wherein said endless tape loop folds are stored so that the tape is unfolded and straightened in passage through the upward branch of the chamber before emerging from said chamber.

2. A cassette as claimed in claim 1, wherein said discontinuity in said walls of said first zone comprises steps on the internal faces of said walls.

3. A cassette as claimed in claim 1, including a container constructed of plastic material, said walls of said chamber comprising two internal side walls of said container, a substantially flat bottom wall and a substantially flat closing cover for said container.

4. A tape cassette having a tape entrance opening and a tape exit opening; a tape folding region adjacent to said entrance having means for causing an entering tape to fold into loops;

an upward branch and a downward branch, said downward branch having a first zone and a second zone, the first zone being below the folding region and having an increasing cross-sectional area which reaches a maximum at the junction between the first and second zones, the second zone having a decreasing cross-section which reaches a minimum at the junction between the downward and upward branches, said upward branch extending from said downward branch to said exit opening;

said minimum cross-section at the junction between the upward and downward branches constituting means for causing the tape loops in the downward branch to unfold as the tape enters the upward branch.

5. A cassette as in claim 4 wherein the first zone of the downward branch includes means for decreasing contact between the edges of the tape and the walls of the cassette so as not to impede the fall of the tape through the downward branch, said means being a discontinuity in the walls of the cassette providing an increase in the width of downward branch.

6. A tape cassette comprising a chamber having a curved form, said chamber including a downward branch and an upward branch meeting at a junction, said chamber accommodating an endless loop information tape in a plurality of folds, the walls of said chamber defining an access opening adjacent said downward branch and an emerging opening adjacent said upward branch, said access and emerging openings being located on the same side of said cassette, said tape loop entering said downward branch through said access opening, passing through said junction and emerging from said upward branch through said emerging opening, wherein the improvement comprises:

said downward branch including first and second zones, said chamber walls defining in said first zone an increasing cross-sectional area through said zone to a predetermined maximum cross-sectional area, and in said second zone defining said cross-sectional area decreasing from said maximum cross-sectional area to a minimum cross-sectional area at the junction between said downward and upward branches, a portion of said second zone of said downward branch adjacent said junction providing a narrowing passage wherein said endless tape loop folds are stored so that the tape is unfolded and straightened in passage through the upward branch of the chamber before emerging from said chamber, said cassette including a container constructed of plastic material, said walls of said chamber comprising two internal side walls of said container, a substantially flat bottom wall and a substantially flat closing cover for said container.

* * * * *